United States Patent [19]

Fox

[11] 3,848,887
[45] Nov. 19, 1974

[54] INFLATABLE SAFETY BELT
[75] Inventor: John William Fox, Ashtead, England
[73] Assignee: Project Laboratories Limited, London, England
[22] Filed: Apr. 25, 1972
[21] Appl. No.: 247,491

[30] Foreign Application Priority Data
Nov. 15, 1971 Great Britain.................... 53014/71

[52] U.S. Cl. ................. 280/150 AB, 9/316, 9/340, 280/150 SB
[51] Int. Cl............................................ B60r 21/08
[58] Field of Search .... 280/150 AB, 150 SB; 9/316, 9/340

[56] References Cited
UNITED STATES PATENTS

| | | | |
|---|---|---|---|
| 2,834,606 | 5/1958 | Bertrand...................... | 280/150 AB |
| 3,146,460 | 9/1964 | Henderson................... | 280/150 AB |
| 3,314,719 | 4/1967 | Johnson....................... | 280/150 SB |
| 3,430,979 | 3/1969 | Terry et al.................... | 280/150 AB |
| 3,486,791 | 12/1969 | Stoffel et al.................. | 280/150 SB |
| 3,499,681 | 3/1970 | Benitez........................ | 280/150 SB |
| 3,682,498 | 8/1972 | Rutzki......................... | 280/150 AB |
| 3,706,463 | 12/1972 | Lipkin......................... | 280/150 AB |

FOREIGN PATENTS OR APPLICATIONS

| | | | |
|---|---|---|---|
| 1,431,098 | 1/1966 | France......................... | 280/150 AB |
| 1,902,793 | 8/1970 | Germany...................... | 280/150 AB |

Primary Examiner—David Schonberg
Assistant Examiner—John P. Silverstrim
Attorney, Agent, or Firm—Sughrue, Rothwell, Mion, Zinn & Macpeak

[57] ABSTRACT

A seat belt for retaining an occupant of a vehicle comprises a hollow inflatable strap member adapted to extend across part of the occupant of the vehicle. A pressurised gas supply is provided to inflate the strap member when required. The gas supply may be controlled by a valve responsive to sudden deceleration of the vehicle.

6 Claims, 6 Drawing Figures

PATENTED NOV 19 1974 3,848,887

INFLATABLE SAFETY BELT

BACKGROUND OF THE INVENTION

The invention relates to safety belts for use in restraining an occupant of a vehicle in the event of sudden changes of speed or direction, such as for example deceleration, of the vehicle.

Various safety devices have been tried for restraining passengers in a vehicle in the event of sudden deceleration such as occurs in an accident. Broadly, three types of safety device have been tried. These are, seat belts which pass across the person to keep the person in position in his seat, inflatable bags arranged to be inflated rapidly in front of the person to protect the person when thrown forwards in the event of a crash, and cushion padding in sufficient quantity to protect occupants of the vehicle when thrown against them. At present, seat belts are widely used and are mainly of the active type which rely on the individual to fasten the belt in order to be of any use. Passive belt arrangements have also been proposed which are either self-fastening as the person enters the car or which need to be fastened before the car can be driven away. In either case, the belts must fit closely around the person in order to prevent damage to the person in the event of an accident and as the belts are normally made of stiff webbing, there is a limit to the maximum pressure which may be exerted safely on the body, and hence the maximum rate of retardation. In the case of inflatable bags, these must be durable when folded away and inflated very rapidly only when an accident occurs. If the bag inflates accidentally, the driver suffers sudden loss of vision which can cause an accident, while if the bag fails to inflate when it should, the occupants have no protection.

Cushion padding is also unsatisfactory in that it is necessarily very bulky and alters the accommodation provided within the car.

SUMMARY OF THE INVENTION

The present invention provides a seat belt for use in restraining an occupant of a vehicle in the event of an accident, which seat belt comprises at least one hollow inflatable strap member adapted to extend across part of the occupant of the vehicle. The invention includes such a seat belt together with means for inflating the strap member in the event of sudden deceleration of the vehicle. Conveniently, the means for inflating the strap member may comprise a compressed air container with a release valve operated by a member responsive to sudden deceleration. Alternatively a cartridge mechanism may be used.

Preferably the strap member is adapted to form a flat web member with opposite walls lying face to face when in the uninflated condition.

In order to increase the area of belt in contact with the occupant in the event of an accident, the strap member may if desired be formed of expandable material so that the width of the strap is greater when inflated. The strap member may, for instance, be adapted to be inflated to a width substantially double the uninflated width.

Conveniently, the strap member is of generally circular cross-section when inflated.

One or more regions along the length of the strap member may be formed of material with different elasticity from the rest of the strap member so as to expand to a greater extent when inflated and thereby provide an enlarged protective cushion at one or more required positions. This is particularly suitable for use on a diagonal strap member arranged to pass across the shoulder of an occupant of the vehicle so as to provide an enlarged protective cushion adjacent the side of the occupant's head.

Figure 3:
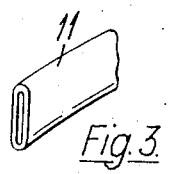
FIG. 3 shows part of an inflatable strap member in the uninflated condition.

In all the examples shown, the seat belt arrangement includes an inflatable strap member of the type shown in FIG. 3. This consists of a hollow inflatable strap 11 which in the uninflated state forms a flat web member with opposite walls lying face to face, like a fire hose. When inflated, the strap adopts a circular cross-section and expands to a greater width than the width in the uninflated state. The belt material is chosen with suitable hoop and longitudinal strengths and elasticities so that when inflated, the belt expands radially without increasing the length of the strap. Conveniently this is done by reinforcing the belt material with reinforcing members extending along its length so as to produce much greater strength in the longitudinal direction than in a radial direction. Furthermore, the elasticity is such as to permit the required radial expansion while retaining sufficient rigidity to prevent the occupant stretching the length of the belt so as to move away from the seat in the event of an accident.

Figure 1:
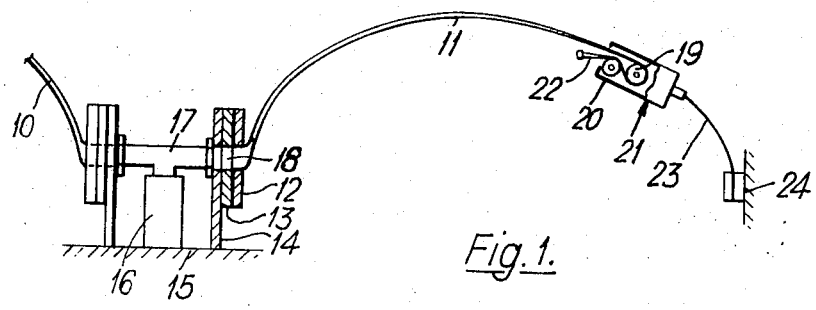
FIG. 1 is a schematic view of a lap belt embodying the present invention.

In the arrangement shown in FIG. 1, a single lap belt is shown. The greater part of the lap strap is formed by an inflatable belt member 11 of the type already described. One end of the belt 11 is clamped between two plate members 12 and 13 which are secured to a fixed support 14 mounted on the floor 15 of the motor vehicle. Also mounted on the floor is a compressed air bottle 16 having a wide outlet arm 17 connected to the support 14. The interior of the arm 17 communicates with the interior of the inflatable strap 11 through a passage 18 provided in the support 14 and plates 12 and 13. The other end of the strap 11 passes around clamping rollers 19 and 20 in a conventional adjustable catch member 21. The walls of the strap 11 are pressed into sealing engagement with each other on passing around the rollers 19 and 20 but the free end 22 is also provided with a sealing member at its end to close the passage within the strap member. The catch 21 also engages a single web member 23 fixed at its far end to a fixed support 24 located at one side of the vehicle seat. In use, the catch 21 is released so that the occupant of the vehicle seat may occupy the seat and then refasten the catch with the lap belt passing in front of the occupant. The length of the belt can be adjusted in a conventional way by adjustment of the strap 11 passing through the rollers 19 and 20. The belt may be adjusted so as to pass loosely across the lap of the person in the vehicle seat with opposite ends of the belt being secured to fixed supports. As the belt is uninflated, the belt is in normal use very similar to a conventional lap belt. However, the outlet from the compressed air bottle 16 is controlled by an inertia release mechanism of the type shown in FIG. 5. In the event of an accident, gas is released from the interior of the bottle so as to inflate the strap 11 to approximately double its normal width. The web 23 does not need to be inflatable as this is not in contact with the occupant of the vehicle seat merely extends down the side of the seat to the fixed anchorage 24.

Figure 2:
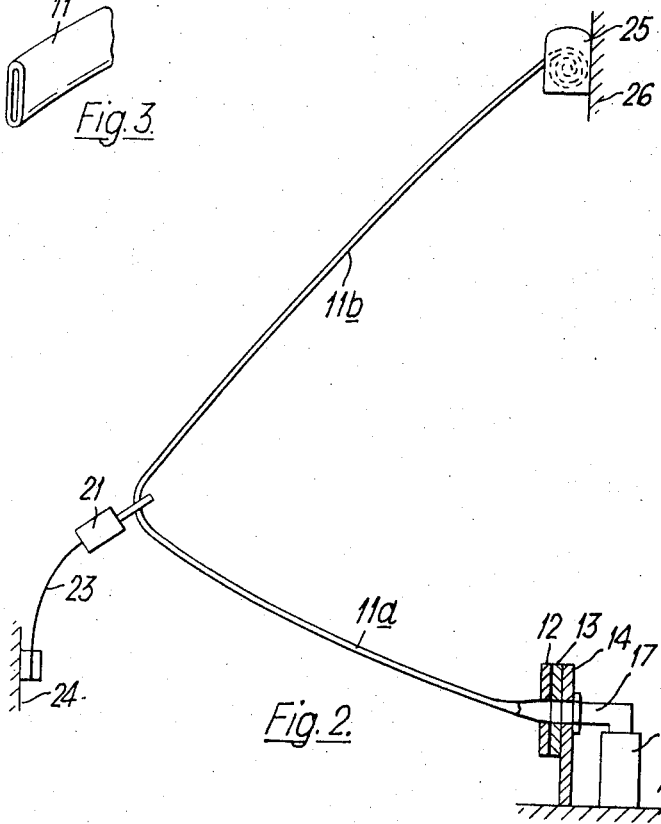
FIG. 2 shows diagrammatically a lap and diagonal belt embodying the present invention.

The arrangement shown in FIG 2 shows a lap and diagonal belt some parts of which are similar to those shown in FIG. 1 and have been marked with similar reference numerals. In this case, the lap part of the belt 11a and the diagonal belt 11b are formed in one length from an inflatable strap member similar to the strap 11 described with reference to FIG. 1. In this case, the upper end of the diagonal strap 11b is fixed to a conventional inertia reel fixing 25 mounted on the door pillar 26 of the vehicle. The lower end of the lap belt 11a is fixed to a fixed mounting and connected to the air bottle 16 in the same way as has already been described in FIG. 1. The inflatable belt passes slidably through part of the catch 21 in a conventional manner. The operation of the FIG. 2 arrangement is generally similar to that of a conventional lap and diagonal belt arrangement coupled with the inflating operation already described with reference to FIG. 1. In this case, both the lap and diagonal sections 11a and 11b inflate in the event of an accident.

Figure 4:
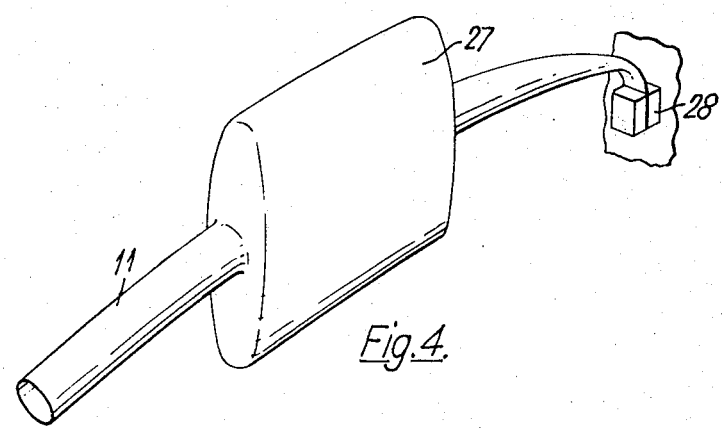
FIG. 4 shows part of an inflated strap member.

The inflatable strap may be formed with regions of different hoop elasticity so as to expand to a greater extent on inflation. Such an arrangement is shown in FIG. 4. This shows an inflatable strap 11 forming part of a diagonal seat belt secured at its upper end to a fixed mounting 28 on the door pillar of a vehicle. In this case, a region 27 is formed of greater elasticity so that on inflation a large protective cushion or head bag is formed part way along the length of the strap 11 and in this case is located between the occupant's head and the side of the vehicle when in use.

Figure 5:
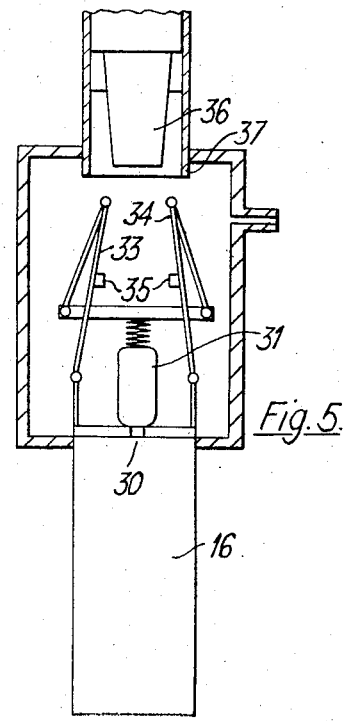
FIG. 5 shows one arrangement for inflating the seat belts.

One arrangement for controlling the valve on the compressed air bottle 16 is shown in FIG. 5. In this case, an opening 30 is one wall of the bottle is closed by a spring urged valve closure member 31. The valve closure member 31 is normally kept in the closed position by an over centre toggle arrangement comprising four pivoted arms. In the closed position, the arms 33 and 34 abut against stop members 35 to prevent the arms passing too far over centre. In order to open the valve, a wedge member 36 is slidably located in a guide tube 37 so that on sudden deceleration, such as occurs in an accident, the wedge member 36 slides out of the tube 37 and into position between the arms 33 and 34. Forward movement of the wedge 36 pushes the arms 33 and 34 outwardly, thereby rotating the arms 32 about their respective pivots until the toggle mechanism passes over centre and allows the air pressure within the container 16 to force the closure member 31 upwardly and release the compressed air to inflate the seat belt.

Figure 6:
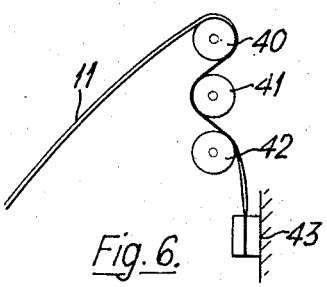
FIG 6 shows a length adjusting device for a seat belt.

In cases where an inertia reel fixing is not provided, other strap adjusting mechanisms may be provided and one example is shown in FIG. 6. In this case, a diagonal strap passes over three rollers 40, 41 and 42 before being clamped to a fixed mounting 43 on the vehicle door pillar. In this case, the rollers 41 and 42 revolve around fixed pivots while the roller 40 revolves around a pivot slidable in a vertical direction. In this way, tension in the belt 11 normally pulls the roller 40 against the roller 41 and clamps the belt in position. When tension in the belt is released, adjustment of its position may be made by pulling the belt through the rollers.

The invention is not restricted to the details of the foregoing examples. For example, the inflatable strap may be used to form any part of a seat belt arrangement. This includes full harnesses, lap and diagonal straps, diagonal straps alone, chest straps or any other arrangement of straps. More than one belt may be inflated by the same compressed air container. It is particularly convenient for two front belts to be operated from the same container, or similarly two rear belts to be operated from the same container. In both these cases, one container may be situated centrally in the vehicle and connected to both belts. Such an arrangement is shown in FIG. 1 where part of a second inflatable belt is marked with the reference numeral 10.

In order to provide adjustability of the belt tension, a spring loaded mechanism may be provided for tensioning the belt, the belt passing through a pinch clamp which can be operated by compressed air to clamp the belt in the event of air being released from the compressed air bottle.

It will be appreciated that the ends of the seat belts may be attached to fixed or adjustable mountings or inertia reel fastenings as may be required.

As the inflatable belt normally lies flat, it may be reeled, fastened and used in the same manner as any conventional seat belt. By use of such inflatable straps, the strap may be loosely positioned around the occupant when in the uninflated state. In the event of an accident, the strap is rapidly inflated so as to tighten up around the occupant and provide a much increased surface area in contact with the occupant. This reduces the pressure at local positions on the occupant thereby reducing the risk of injury. Furthermore the air in the belt also acts as a cushion and provides added protection. Should the belt inflate accidentally at a time when not required, no harm is done and the driver's ability to control the vehicle is not impaired. Furthermore, should the belt fail to inflate when required, the body still has the protection of a normal seat belt. As the belt is far less bulky than known air bags, there should be less noise on inflation and less likelihood of damage to the eardrums. The pressure generated within the car on inflation of the belt until also be less than is the case with an air bag. Furthermore, the belt keeps the occupant in position and offers protection at all times. The belt material can be carefully chosen with respect to its diameter and radial and longitudinal strength and elasticities. In particular, the belt may be made of a soft material to the touch and may normally be fastened very loosely around the person relying on inflation to tighten up the belt for maximum protection in a crash. As the belt will not be rolled or folded away for most of its life, the durability of the material is improved. The air bottles required to inflate the belt can be of small capacity and operate at relatively low pressures. The interior of the car need not be modified to take inflatable seat belts. The pressure release valves on the gas containers can be preset to operate on heavy braking of the car to prevent the body being thrown forwards. A spare bottle can be carried in the car to replace the used bottle to restore full protection without delay. The bottles are preferably rechargeable. The valve controlling the bottles may be arranged to respond to deceleration in a particular direction so that a spare bottle carried in the car may be orientated so as to avoid releasing its air in the event of a crash.

I claim:

1. A restraint system for restraining an occupant of a vehicle in the event of sudden deceleration, said system comprising:

at least one hollow inflatable strap member in the form of a hose having a closed hose wall, said strap member being adapted to be secured at its ends and to extend across part of the occupant of the vehicle, said hose being formed of elastic material having greater elasticity in the radial direction than in the longitudinal direction, whereby said hose will expand in width on inflation to a width substantially greater than its uninflated width in order to provide cushioning for the occupant while at the same time expanding substantially not at all in the longitudinal direction;

gas supply means adapted to supply gas to inflate the hose; and control means for controlling the supply of gas from the gas supply means, said control means being arranged to respond to an impact causing sudden deceleration and to operate said gas supply means independently of tension in said inflatable strap member.

2. A restraint system as claimed in claim 1 in which at least one region along the length of said hose is formed of material with greater elasticity in the radial direction than the rest of said hose so as to expand to a greater extent when inflated and thereby provide an enlarged protective cushion at a required position.

3. A restraint system as claimed in claim 2 in which said hose is arranged to form a diagonal hose and said region of greater elasticity is provided near the upper end of the strap so as to form a protective cushion, when inflated, at the side of the occupant's head.

4. A restaint system as claimed in claim 1 in which said hose is provided with longitudinal reinforcement to resist longitudinal expansion.

5. A restraint system as claimed in claim 1 wherein said hose is adapted to form a flat web member with opposite walls lying face to face when in the uninflated condition.

6. A restraint system as claimed in claim 1 in which said hose is adapted to be inflated to a width substantially double the uninflated width.

* * * * *